US010815259B2

(12) United States Patent
Chiu et al.

(10) Patent No.: US 10,815,259 B2
(45) Date of Patent: Oct. 27, 2020

(54) METHOD OF SYNTHESIZING CARBOXYL-MODIFIED MOLYBDENUM DISULFIDE

(71) Applicant: NATIONAL TAIWAN NORMAL UNIVERSITY, Taipei (TW)

(72) Inventors: Nan-Fu Chiu, Taipei (TW); Ting-Li Lin, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 15/963,107

(22) Filed: Apr. 26, 2018

(65) Prior Publication Data

US 2019/0352319 A1   Nov. 21, 2019

(30) Foreign Application Priority Data

Jan. 15, 2018 (TW) .............................. 107101427 A

(51) Int. Cl.
*C07F 11/00* (2006.01)
(52) U.S. Cl.
CPC .................................. *C07F 11/005* (2013.01)
(58) Field of Classification Search
None
See application file for complete search history.

(56) References Cited

FOREIGN PATENT DOCUMENTS

CN       105271411      *   1/2016    ............. C01G 39/06

OTHER PUBLICATIONS

CN-105271411 Derwent Abstract, 2016, 2 pages.*
Russell R Chianelli et al.—Catalytic Properties of Single Layers of Transition Metal Sulfide Catalytic Materials.
Anders Tuxen et al.—Size Threshold in the Dibenzothiophene Adsorption on MoS2 Nanoclusters.
Dong Min Sim et al.—Controlled Doping of Vacancy-Containing Few-Layer MoS2 via Highly Stable Thiol-Based Molecular Chemisorption.
Stanley S. Chou et al.—Ligand Conjugation of Chemically Exfoliated MoS2.
Xin Chen et al.—Functionalization of Two-Dimensional MoS2: On the Reaction Between MoS2 and Organic Thiols.
Xia Yang et al.—Greatly improved mechanical and thermal properties of chitosan by carboxyl-functionalized MoS2 nanosheets.
Maísa Azevedo Beluomini et al.—D-mannitol sensor based on molecularly imprinted polymer on electrode modified with reduced graphene oxide decorated with gold nanoparticles.

* cited by examiner

*Primary Examiner* — Clinton A Brooks

(57) ABSTRACT

A method of synthesizing carboxyl-modified molybdenum disulfide comprises the steps of a) preparing a molybdenum disulfide solution; b) adding hydrogen bromide (HBr) to the molybdenum disulfide solution, followed by blending the mixture; and c) adding oxalic acid (OA) to the molybdenum disulfide solution, followed by blending the mixture. The molybdenum disulfide synthesized by the method is applicable to a biosensing chip. The carboxyl-modified molybdenum disulfide effectively enhances sensitivity of a detection device having the biosensing chip.

3 Claims, 8 Drawing Sheets

METHOD OF SYNTHESIZING CARBOXYL-MODIFIED MOLYBDENUM DISULFIDE

CROSS-REFERENCE TO RELATED APPLICATION

This non-provisional application claims priority under 35 U.S.C. § 119(a) on Patent Application No(s). 107101427 filed in Taiwan, R.O.C. on Jan. 15, 2018, the entire contents of which are hereby incorporated by reference.

FIELD OF THE INVENTION

The present invention relates to methods of synthesizing molybdenum disulfide and, more particularly, to a method of synthesizing carboxyl-modified molybdenum disulfide.

BACKGROUND OF THE INVENTION

Two-dimensional molybdenum disulfide (2D $MoS_2$) is usually regarded as characterized by perfect lattices. In fact, sulfur vacancies are not only abundant on the surface of the molecule of molybdenum disulfide but also important to surface modification, as disclosed in R. Chianelli, M. Siadati, M. De la Rosa, G. Berhault, J. Wilcoxon, R. Bearden and B. Abrams, "Catalytic Properties of Single Layers of Transition Metal Sulfide Catalytic Materials," *Catalysis Reviews*, 2006, 48, 1-41.

Depending on its crystalline structure, molybdenum disulfide is of two types: 2H and 1T. Monolayer $MoS_2$ of type 2H not only features a direct band gap but also demonstrates characteristics of semiconductor and photoluminescence. By contrast, type-1T $MoS_2$ is metallic. Hence, it is worth noting that various synthesis methods are employed to change the nature of $MoS_2$ by causing defects to the lattices of $MoS_2$ or introducing excessive negative charges into the lattices of $MoS_2$ so as to alter the 2H-1T ratio. Furthermore, surface modification provides more ways to modulate the characteristics of $MoS_2$.

In 2010, A. Tuxen et al. (A. Tuxen, J. Kibsgaard, H. Gobel, E. Lægsgaard, H. Topsoe, J. V. Lauritsen and F. Besenbacher, "Size Threshold in the Dibenzothiophene Adsorption on $MoS_2$ Nanoclusters," *ACS Nano*, 2010, 4, 4677-4682) disclosed observing monolayer $MoS_2$ nanoclusters which dibenzothiophene (DBT) is adsorbed to with a scanning tunneling microscope (STM), thereby giving the earliest direct proof of successful functionalization of transition metal dichalcogenide (TMD) materials. At present, well-known methods of functionalizing and modifying the surfaces of molecules of $MoS_2$ involve causing defects, that is, S-vacancies, to the crystal lattices of $MoS_2$ by chemical exfoliation and then introducing organic thiols to be adsorbed to the S-vacancies (D. Sim, M. Kim, S. Yim, M. Choi, J. Choi, S. Yoo and Y. S. Jung "Controlled Doping of Vacancy-Containing Few-Layer $MoS_2$ via Highly Stable Thiol-Based Molecular Chemisorption," *ACS Nano*, 2015, 9, 12115-12123.) S. S. Chou et al. (S. Chou, M. De, J. Kim, S. Byun, C. Dykstra, J. Yu, J. Huang and V. P. Dravid, "Ligand Conjugation of Chemically Exfoliated $MoS_2$," *J. Am. Chem. Soc.*, 2013, 135, 4584-4587) disclosed mixing chemically exfoliated $MoS_2$ and mercapto of polyethylene glycol (PEG) ligands roughly to form functionalized $MoS_2$ molecule which carries a hydroxyl group, a carboxyl group, and trimethylammonium and thus serves as an aqueous 2D material which features significant colloidal stability. Last but not least, in 2016 A. R. McDonald et al. (X. Chen, N. C. Berner, C. Backes, G. S. Duesberg and A. R. McDonald, "Functionalization of Two-Dimensional $MoS_2$: On the Reaction Between $MoS_2$ and Organic Thiols," *Angew. Chem. Int. Ed.*, 2016, 55, 5803-5808) disclosed that caution must be exercised in functionalizing TMD materials with organic thiols because the odds are that, instead of forming bonds with the surfaces of the molecules of $MoS_2$, thiols will be physically adsorbed thereto and thus easily removed therefrom.

Although the development of technology of functionalization of $MoS_2$ is still in its early stage, it will be rapid when following that of covalent modification of the other nanomaterials. Furthermore, functionalized $MoS_2$ has a lot of potential in terms of its application to biomedicine, because of its high photothermal performance, high photoluminescence, high sensitivity to environmental factors, and excellent biocompatibility.

SUMMARY OF THE INVENTION

Conventional methods of functionalizing $MoS_2$ still have room for improvement. In view of this, it is an objective of the present invention to provide a method of synthesizing carboxyl-modified molybdenum disulfide such that the surface of the molecule of molybdenum disulfide is effectively modified with a carboxyl group (—COOH).

In order to achieve the above and other objectives, the present invention provides a method of synthesizing carboxyl-modified molybdenum disulfide, comprising the steps of:
a) preparing a molybdenum disulfide solution;
b) adding hydrogen bromide (HBr) to the molybdenum disulfide solution and blending the mixture; and
c) adding oxalic acid (OA) to the molybdenum disulfide solution and blending the mixture.

In an embodiment of the present invention, the molybdenum disulfide solution in step a) is of a concentration of 0.1~10 mg/ml.

In an embodiment of the present invention, the blend in step b) takes 0.5~24 hours.

In an embodiment of the present invention, the blend in step c) takes 0.5~24 hours.

In order to achieve the above and other objectives, the present invention further provides a method of synthesizing carboxyl-modified molybdenum disulfide, comprising the steps of:
a) preparing a molybdenum disulfide solution; and
b) adding sodium hydroxide (NaOH) and monochloroacetic acid (MCA) to the molybdenum disulfide solution and allowing the mixture to undergo ultrasonic vibration.

In an embodiment of the present invention, the molybdenum disulfide solution in step a) is of a concentration of 0.1~10 mg/ml.

In an embodiment of the present invention, the ultrasonic vibration in step b) takes 1-3 hours.

Unlike conventional methods of functionalizing $MoS_2$, the method of synthesizing carboxyl-modified molybdenum disulfide according to the present invention effectively modifies the surface of the molecule of molybdenum disulfide with a carboxyl group (—COOH). The molybdenum disulfide synthesized by the method of the present invention is applicable to a biosensing chip. With the molybdenum disulfide being carboxyl-modified, the sensitivity of a detection device comprising the biosensing chip is enhanced effectively.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
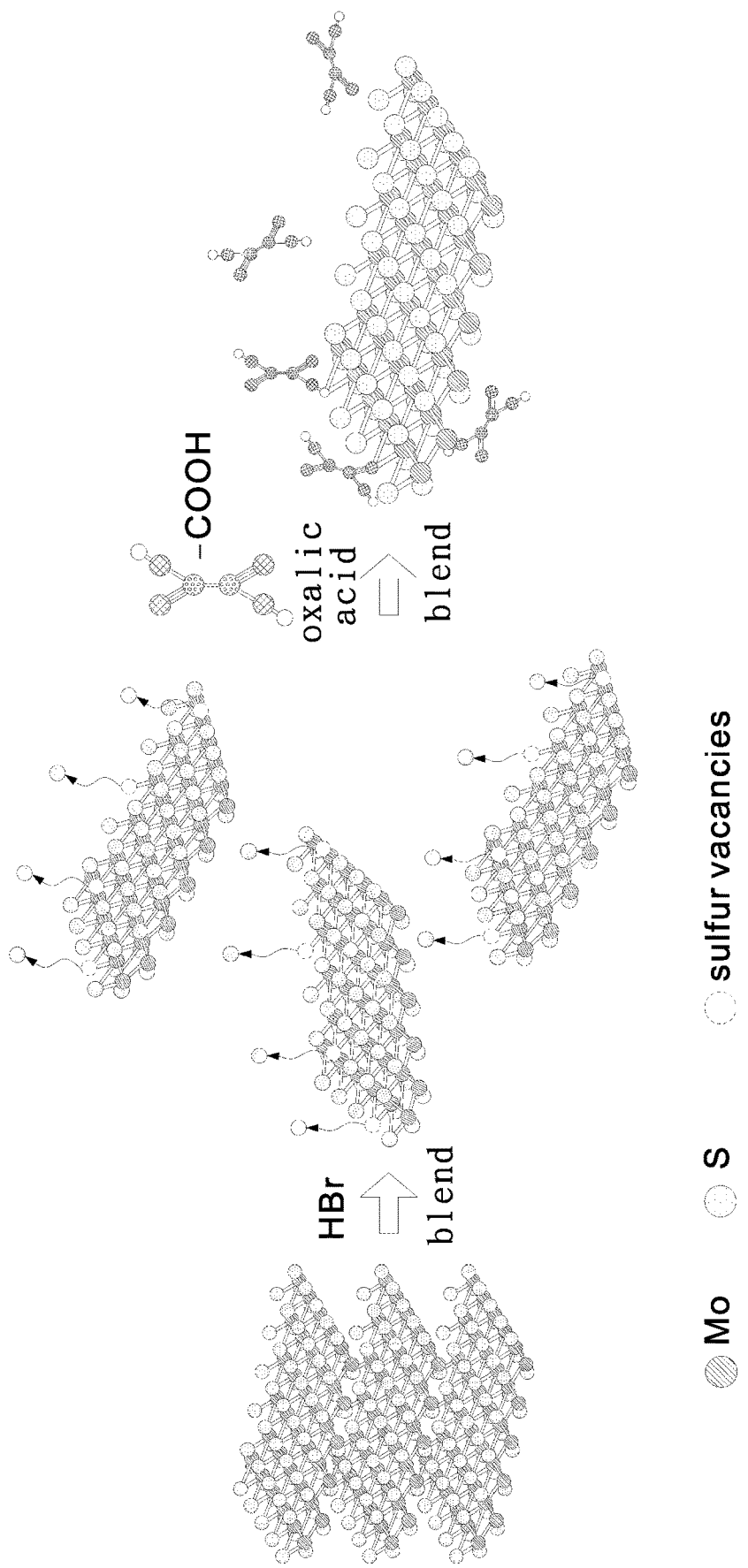
FIG. 1 is a schematic view of a synthesis method according to Embodiment 1 of the present invention.

The sizes of atoms and molecules shown in the drawings of the present invention are adjusted, omitted or simplified for the sake of illustration and clarity. Regarding related components, the drawings of the present invention are not drawn to scale.

Embodiment 1: Modifying Molybdenum Disulfide with Oxalic Acid (OA)

FIG. 1 is a schematic view of a synthesis method according to Embodiment 1 of the present invention. Referring to FIG. 1, the synthesis method in Embodiment 1 of the present invention is described below.

Steps of Synthesis:
a) preparing 15 ml of 2 mg/ml molybdenum disulfide solution with deionized water;
b) adding 5 mL of hydrogen bromide (HBr) to the molybdenum disulfide solution prepared in step a) and blending the mixture for 12 hours; and
c) adding 1.5 g of oxalic acid (OA) to the mixture prepared in step b) and blending the resultant mixture with a rocker for 4 hours (speed 4) to form OA-modified molybdenum disulfide.

It is feasible to perform centrifugal separation on the evenly mixed solution formed in step c) above with a centrifugal separator and then replace the supernatant with deionized water, thereby producing a carboxyl-modified molybdenum disulfide aqueous solution ($MoS_2$—COOH (OA)).

In step a), the concentration of the molybdenum disulfide solution is not restricted by the present invention. Preferably, the concentration of the molybdenum disulfide solution is 0.1~10 mg/ml.

In step b), the duration of the blend is not restricted by the present invention.

Preferably, the blend takes 0.5~24 hours.

Embodiment 2: Modifying Molybdenum Disulfide with Monochloroacetic Acid (MCA)

Figure 2:
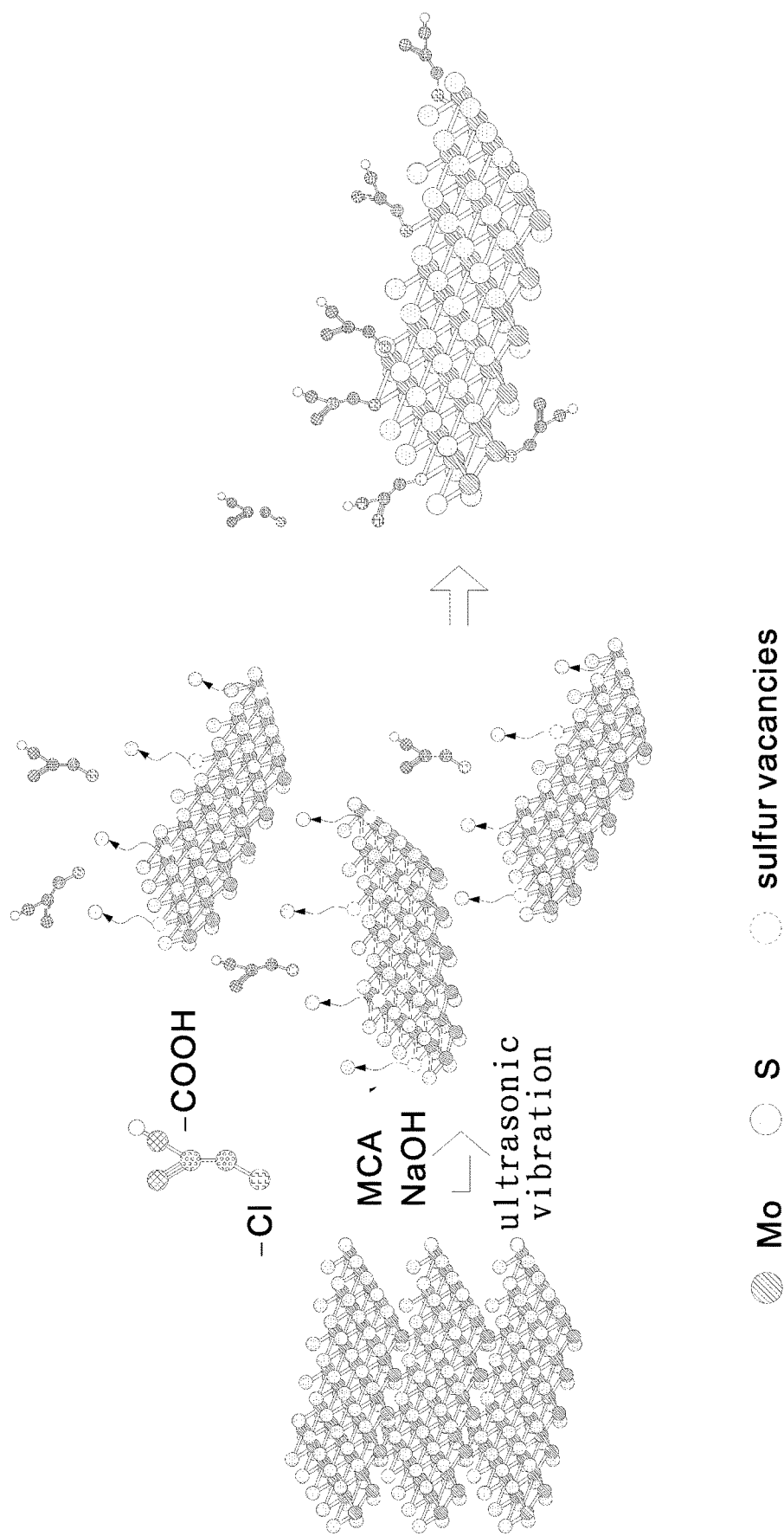
FIG. 2 is a schematic view of a synthesis method according to Embodiment 2 of the present invention.

FIG. 2 is a schematic view of a synthesis method according to Embodiment 2 of the present invention. Referring to FIG. 2, the synthesis method in Embodiment 2 of the present invention is described below.

Steps of Synthesis:
a) preparing 15 ml of 2 mg/ml molybdenum disulfide solution with deionized water; and
b) adding 1.2 g of sodium hydroxide (NaOH) and 1.0 g of monochloroacetic acid (MCA) to the molybdenum disulfide solution and allowing the mixture to undergo ultrasonic vibration for 1-3 hours, so as for sulfur vacancies to form on the surface of $MoS_2$ and for the sulfur vacancies to be occupied by chlorine atoms of the monochloroacetic acid, thereby forming MCA-modified molybdenum disulfide.

Afterward, the evenly mixed solution formed in step b) above undergoes centrifugal separation with a centrifugal separator, and then the supernatant is replaced with deionized water, thereby producing a MCA-modified carboxyl-containing molybdenum disulfide aqueous solution, also known as $MoS_2$—COOH (MCA).

Test Example 1 and Test Example 2, which are described below, involve not only analyzing $MoS_2$—COOH (OA) prepared in Embodiment 1 and $MoS_2$—COOH (MCA) prepared in Embodiment 2 with X-ray photoelectron spectroscopy (XPS), but also analyzing $MoS_2$ with XPS to serve as a control.

Figure 3:
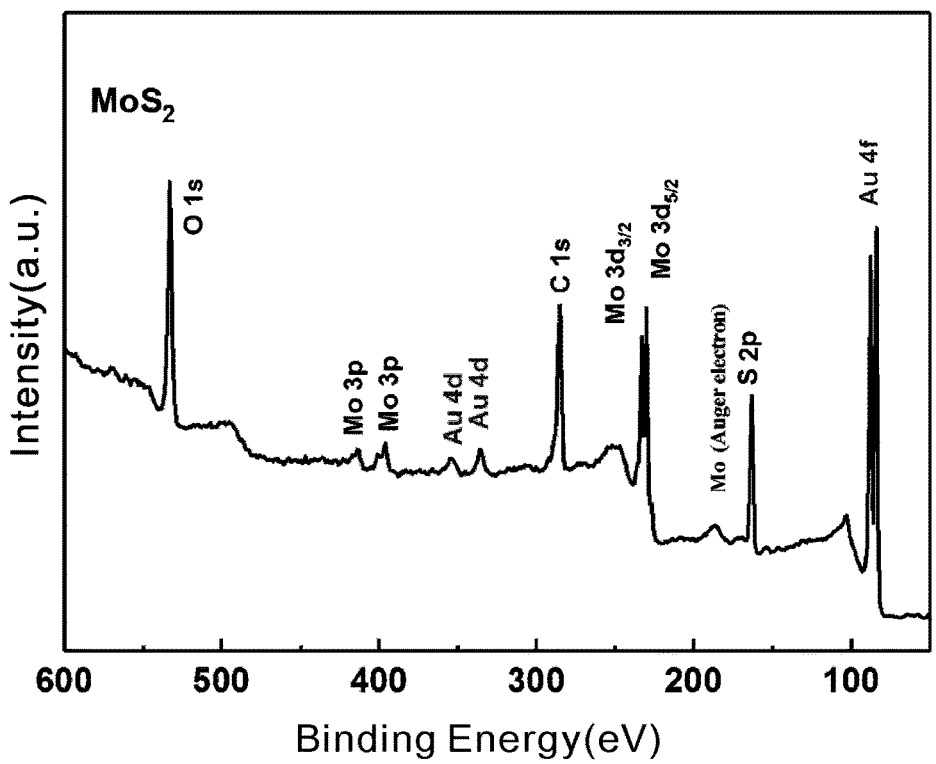
FIG. 3 is an XPS full spectrum of $MoS_2$.
Figure 4:
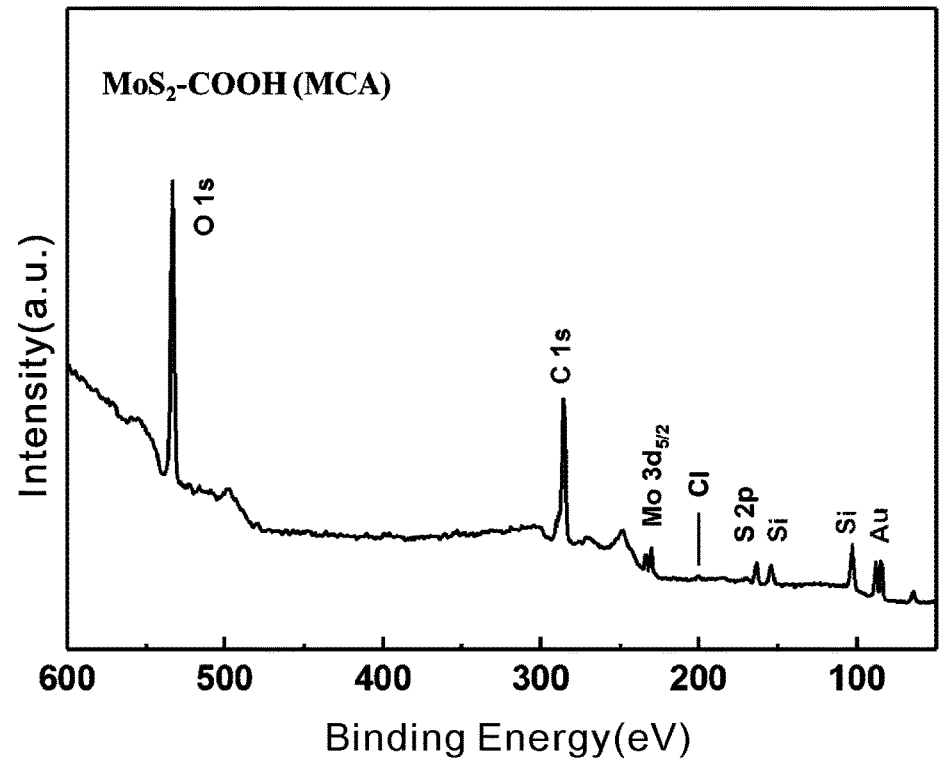
FIG. 4 is an XPS full spectrum of $MoS_2$—COOH (MCA) prepared in Embodiment 2.
Figure 5:
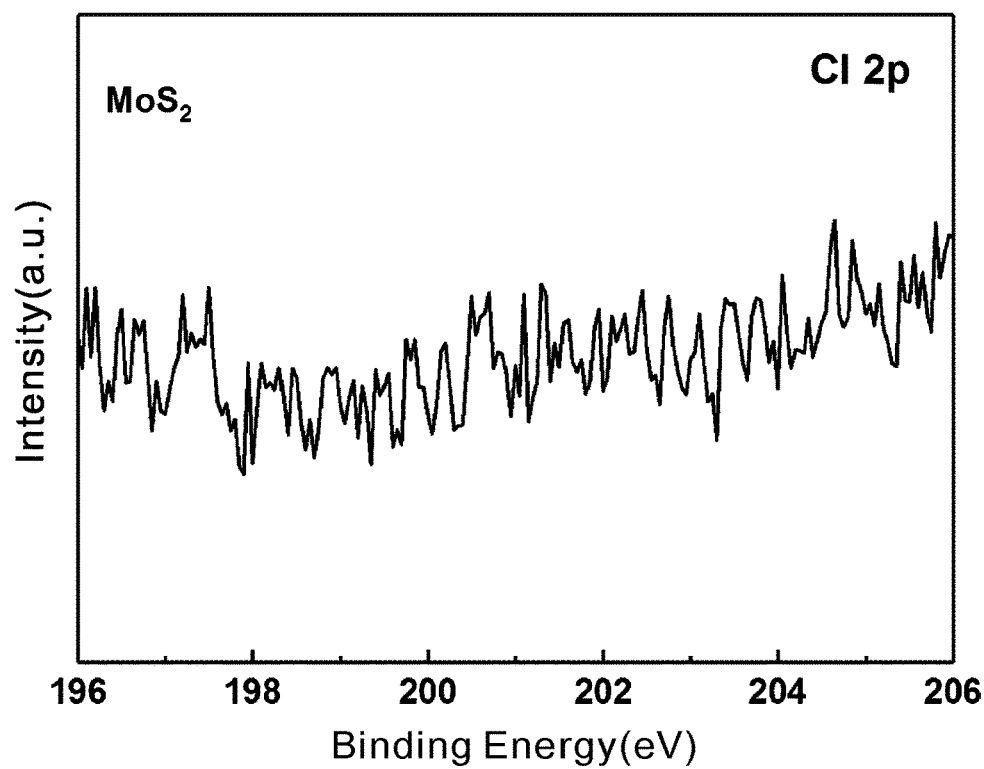
FIG. 5 is an XPS fine scan of element chlorine of $MoS_2$.
Figure 6:
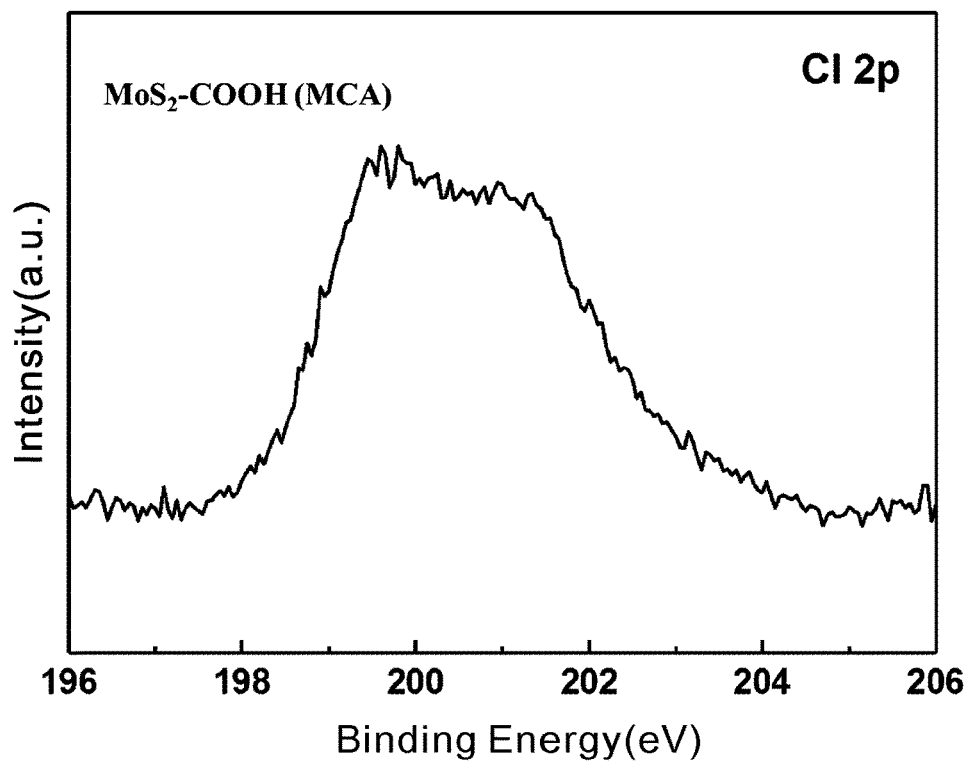
FIG. 6 is an XPS fine scan of element chlorine of the $MoS_2$—COOH (MCA) prepared in Embodiment 2.

FIG. 3 and FIG. 4 are XPS full spectra of $MoS_2$ and $MoS_2$—COOH (MCA) prepared in Embodiment 2, respectively. FIG. 5 and FIG. 6 are XPS fine scans of element chlorine of $MoS_2$ and element chlorine of the $MoS_2$—COOH (MCA) prepared in Embodiment 2, respectively.

Test Example 1: XPS-Based Analysis of $MoS_2$—COOH (MCA) Prepared in Embodiment 2

X-ray photoelectron spectroscopy (XPS), also known as electron spectroscopy for chemical analysis (ESCA), is a surface-sensitive quantitative spectroscopic technique that not only measures the elemental composition of a material but is also capable of analyzing chemical bonds. Surface modification is the act of modifying or improving the surface of a material in terms of its characteristics and thus is applicable to the analysis of the chemical characteristics of the surface of a material and surface engineering research. In Test Example 1, XPS is performed with the 24A1 beam of Taiwan's National Synchrotron Radiation Research Center (NSRRC) with a view to detecting whether the surface of a material is modified with a carboxyl group (—COOH) and analyzing the types and contents of oxygen-containing groups of element carbon and element oxygen after the surface modification.

The course of XPS is accompanied by abundance of easily-measured carbon and oxygen atoms, which is true even when unmodified $MoS_2$ is being measured. Test Example 1 aims to calculate the carbon to molybdenum ratio of intensity and the oxygen to molybdenum ratio of intensity, so as to confirm whether the carbon and oxygen content of the material has increased and confirm whether the modification is successful.

Referring to FIG. 3 and FIG. 4, main characteristic peak values of Au fall at 84 eV (Au $4f_{7/2}$) and 88 eV (Au $4f_{5/2}$), and the former is used as a reference for correction of the measurement results of Test Example 1. As indicated by a comparison of FIG. 3 and FIG. 4, in addition to the difference in intensity ratio between the elements, a peak value, which is not shown in FIG. 3, is shown in FIG. 4 at 200 eV and identified by table lookup to be a characteristic peak of Cl 2p.

In Embodiment 2, the mechanism for MCA-based modification of $MoS_2$ involves occupation of sulfur vacancies by chlorine atoms. A fine scan of $MoS_2$ and a fine scan of $MoS_2$—COOH (MCA) prepared in Embodiment 2 are performed at 196 eV through 206 eV to confirm whether the modified $MoS_2$—COOH (MCA) contains element chlorine, only to reveal that they contain little element chlorine as shown in FIG. 5 and FIG. 6. However, FIG. 6 proves a fact about the $MoS_2$—COOH (MCA) prepared in Embodiment 2, that is, the surface of the molecule of $MoS_2$ is modified with MCA through the occupation of sulfur vacancies by chlorine atoms.

Analysis of Group Content:

Test Example 1 entails performing fine analysis of the group content of the $MoS_2$—COOH (MCA) prepared in Embodiment 2 with X-ray photoelectron spectroscopy (XPS) and that of $MoS_2$, and using the analysis result of the latter as a control.

Figure 7:
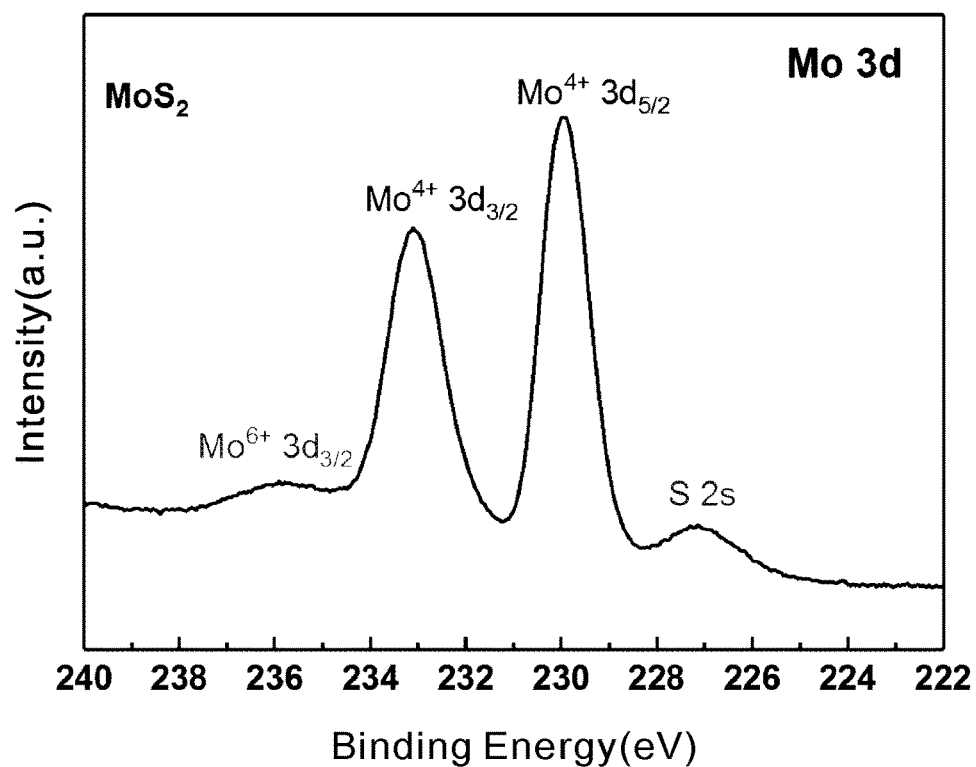
FIG. 7 is an XPS fine scan of element molybdenum of $MoS_2$.
Figure 8:
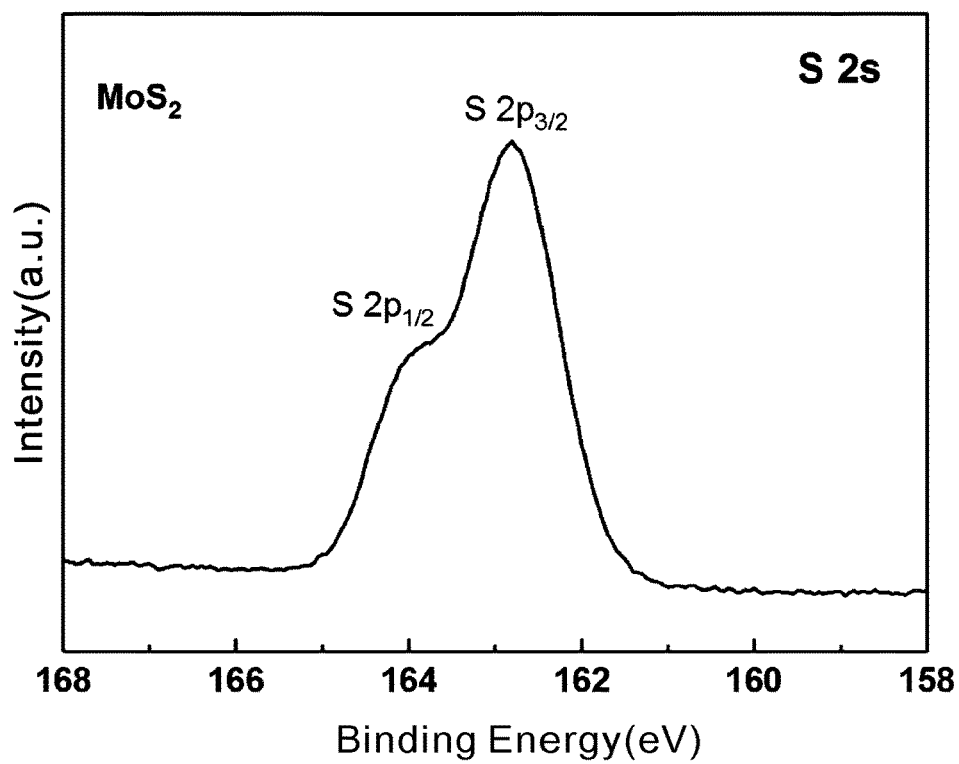
FIG. 8 is an XPS fine scan of element sulfur of $MoS_2$.
Figure 9:
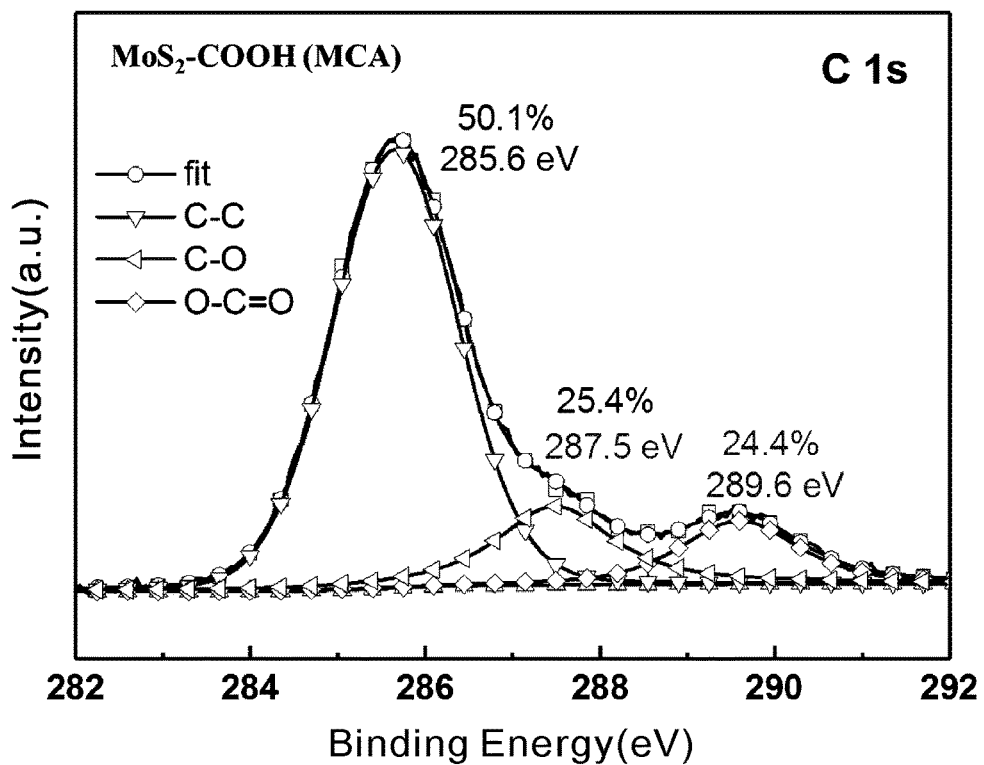
FIG. 9 shows the result of analysis of group content of element carbon of the $MoS_2$—COOH (MCA) prepared in Embodiment 2.
Figure 10:
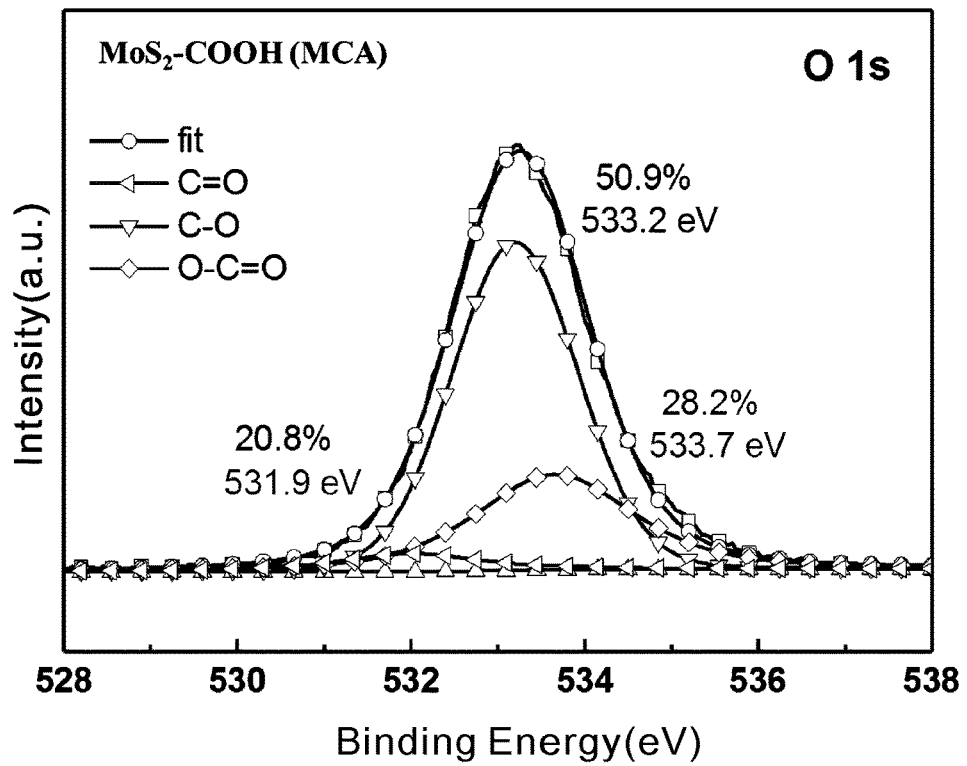
FIG. 10 shows the result of analysis of group content of element oxygen of the $MoS_2$—COOH (MCA) prepared in Embodiment 2.

FIG. 7 and FIG. 8 are XPS fine scans of element molybdenum and element sulfur of $MoS_2$, respectively. FIG. 9 and FIG. 10 show the results of analysis of group content of element carbon and element oxygen of the $MoS_2$—COOH (MCA) prepared in Embodiment 2, respectively.

FIG. 7 shows two characteristic peaks of Mo of $MoS_2$, namely $Mo^{4+}3d_{5/2}$ (230 eV) and $Mo^{4+}3d_{3/2}$ (233 eV), and a S 2s peak value at 227 eV. FIG. 8 shows two characteristic peaks of S of $MoS_2$, namely S $2p_{3/2}$ (162.8 eV) and S $2p_{1/2}$ (163.95 eV). When compared with $MoS_2$, the S peak value and Mo of the $MoS_2$—COOH (MCA) prepared in Embodiment 2 demonstrate no significant change. FIG. 9 and FIG. 10 show the results of analysis of fine scans of characteristic peaks of element carbon and element oxygen of the $MoS_2$—COOH (MCA) prepared in Embodiment 2 to identify the types of bonds between a carbon atom, an oxygen atom, and any other element. As shown in FIG. 9, C1s has two characteristic peaks each including three different sub-peaks, namely C—C, C—O and O—C=O, and located at 258.6 eV, 287.5 eV and 289.6 eV, respectively (X. Yang, N. Meng, Y. Zhu, Y. Zhou, W. Nie and P. Chen, "Greatly Improved Mechanical and Thermal Properties of Chitosan by Carboxyl-Functionalized $MoS_2$ Nanosheets," *J. Mater. Sci.*, 2015, 51, 1344-1353), wherein O—C=O corresponds to a carboxyl group obviously and has a high proportion of 24.4%. The analysis results show that C1s accounts for the majority of the oxygen-containing groups of the $MoS_2$—COOH (MCA). With reference to M. Beluomini, J. da Silva, G. Sedenho and N. Stradiotto, "D-mannitol Sensor Based on Molecularly Imprinted Polymer on Electrode Modified with Reduced Graphene Oxide Decorated with Gold Nanoparticles," *Talanta*, 2017, 165, 231-239, Test Example 1 entails analyzing O1s characteristic peaks and reveals that O1s includes three different sub-peaks, namely C=O, C—O and O—C=O, which are located at 531.9 eV, 533.2 eV, and 533.7 eV, respectively, with O—C=O accounting for 28.2% of the groups, as shown in FIG. 10.

Test Example 2: XPS-Based Analysis of $MoS_2$—COOH (OA) Prepared in Embodiment 1

Figure 11:
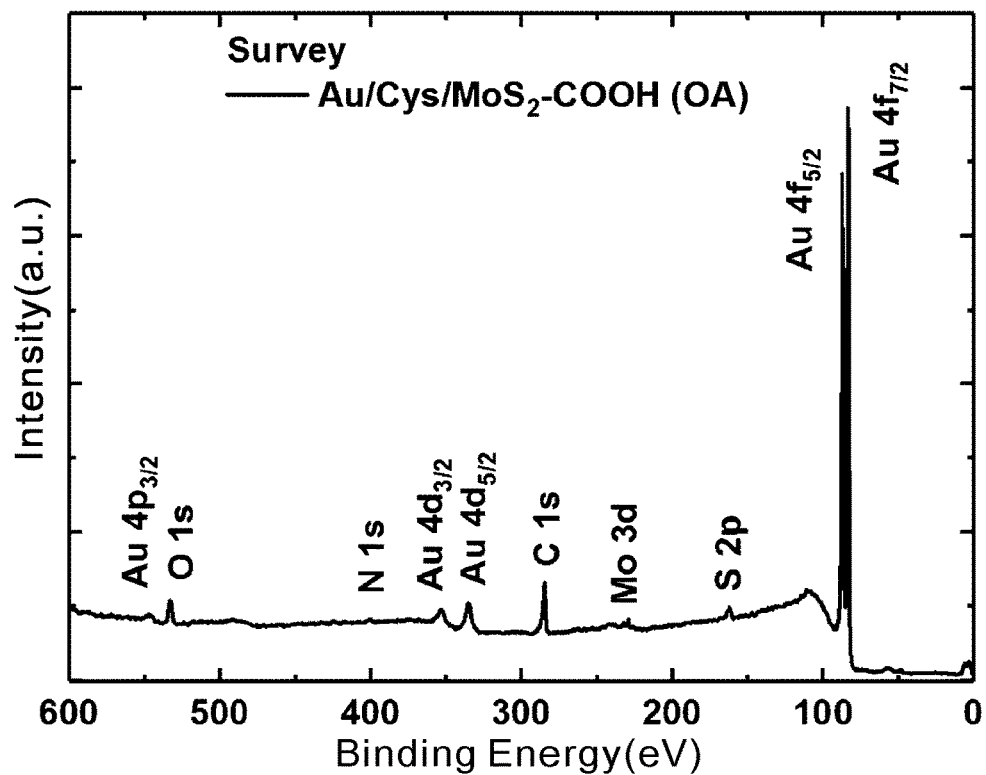
FIG. 11 is an XPS full spectrum of $MoS_2$—COOH (OA) prepared in Embodiment 1.
Figure 12:
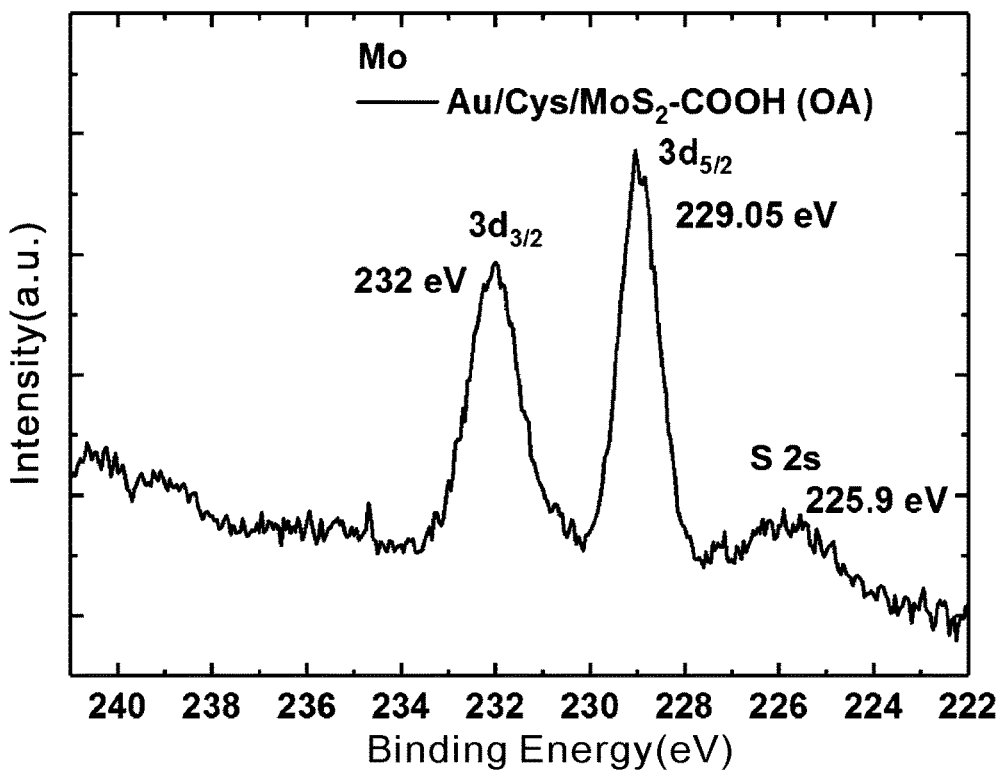
FIG. 12 is an XPS fine scan of element molybdenum of the $MoS_2$—COOH (OA) prepared in Embodiment 1.
Figure 13:
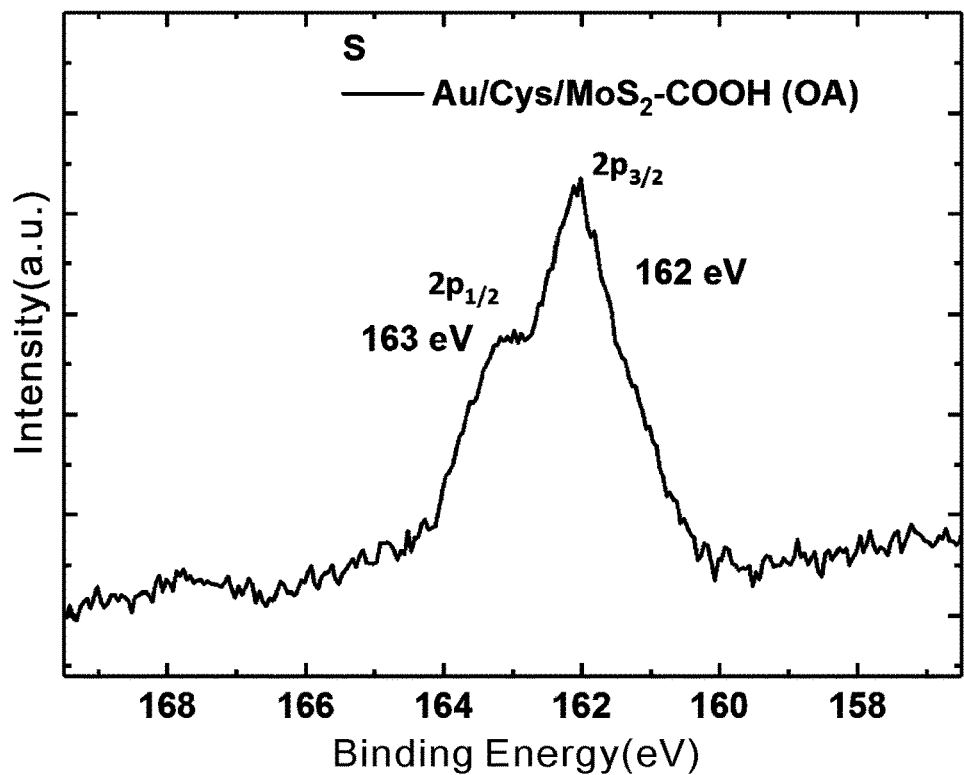
FIG. 13 is an XPS fine scan of element sulfur of the $MoS_2$—COOH (OA) prepared in Embodiment 1.

FIG. 11 is an XPS full spectrum of $MoS_2$—COOH (OA) prepared in Embodiment 1. FIG. 12 is an XPS fine scan of element molybdenum of the $MoS_2$—COOH (OA) prepared in Embodiment 1, showing two characteristic peaks, namely $Mo^{4+}3d_{5/2}$ (229.05 eV) and $Mo^{4+}3d_{3/2}$ (232 eV), and an S 2s peak value at 225.9 eV. FIG. 13 is an XPS fine scan of element sulfur of the $MoS_2$—COOH (OA) prepared in Embodiment 1, showing two characteristic peaks, namely S $2p_{3/2}$ (162 eV) and S $2p_{1/2}$ (163 eV), wherein the Mo, S peak values of $MoS_2$—COOH (OA) demonstrate no significant change.

Figure 14:
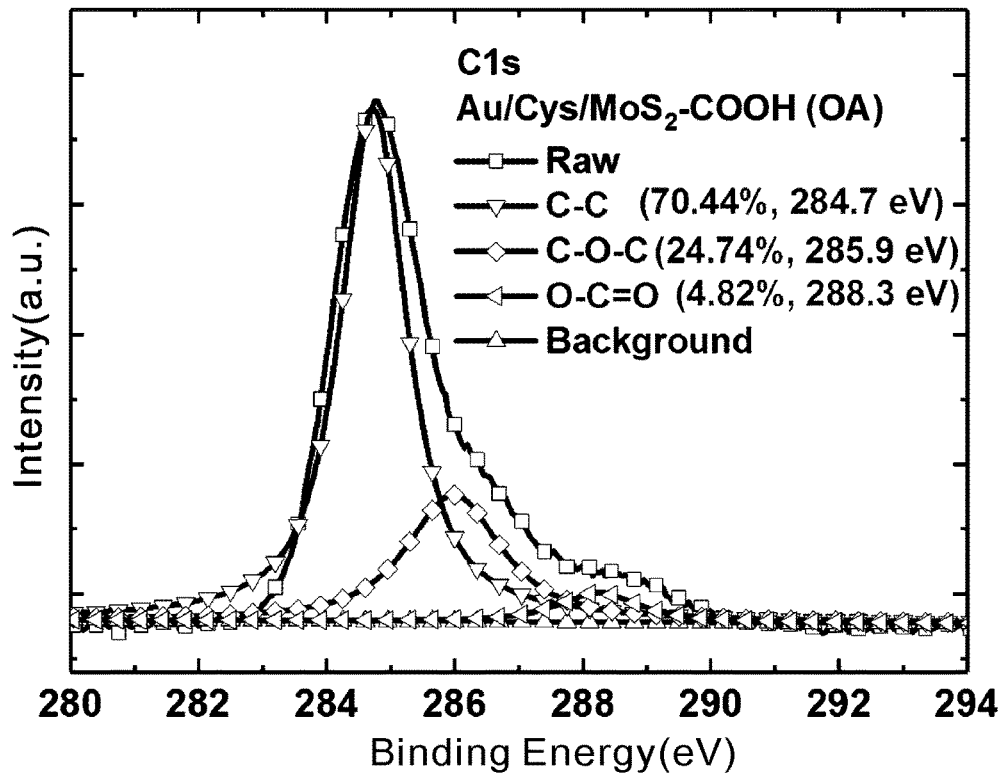
FIG. 14 shows the result of analysis of group content of element chlorine of the $MoS_2$—COOH (OA) prepared in Embodiment 1.

Afterward, a fine scan of C1s characteristic peaks of $MoS_2$—COOH (OA) is carried out, revealing the types of bonds of carbon atom and the other elements. FIG. 14 shows the result of analysis of group content of element chlorine of the $MoS_2$—COOH (OA) prepared in Embodiment 1. As shown in FIG. 14, C1s has two characteristic peaks each including three different sub-peaks, namely C—C, C—O—C and O—C=O, and located at 284.7 eV, 285.9 eV and 288.9 eV, respectively (X. Yang, N. Meng, Y. Zhu, Y. Zhou, W. Nie and P. Chen, "Greatly Improved Mechanical and Thermal Properties of Chitosan by Carboxyl-Functionalized $MoS_2$ Nanosheets," *J. Mater. Sci.*, 2015, 51, 1344-1353), wherein O—C=O corresponds to a carboxyl group obviously and has a high proportion of 4.82%. The analysis results show that C1s accounts for the majority of the oxygen-containing groups of the $MoS_2$—COOH (OA).

The XPS-based analyses described in Test Example 1 and Test Example 2 prove that a method of synthesizing carboxyl-modified molybdenum disulfide according to the present invention can modify the surface of the molecule of molybdenum disulfide with a carboxyl group (—COOH). The result of the analysis of the group content in Test Example 2 proves that the method of synthesizing carboxyl-modified molybdenum disulfide according to the present invention can modify the surface of the molecule of molybdenum disulfide with a carboxyl group (—COOH) to a large extent.

The molybdenum disulfide synthesized by the method of the present invention is applicable to a biosensing chip. The carboxyl-modified molybdenum disulfide effectively enhances sensitivity of a detection device having the biosensing chip.

The present invention is disclosed above by preferred embodiments. However, persons skilled in the art should understand that the preferred embodiments are illustrative of the present invention only, but shall not be interpreted as restrictive of the scope of the present invention. Hence, all equivalent modifications and replacements made to the aforesaid embodiments shall fall within the scope of the present invention. Accordingly, the legal protection for the present invention shall be defined by the appended claims.

What is claimed is:
1. A method of synthesizing carboxyl-modified molybdenum disulfide, comprising the steps of:
 a) preparing a molybdenum disulfide solution; and
 b) adding sodium hydroxide (NaOH) and monochloroacetic acid (MCA) to the molybdenum disulfide solution, followed by treating the mixture by ultrasonic vibration.

2. The method of claim 1, wherein concentration of the molybdenum disulfide solution in step a) is 0.1~10 mg/ml.

3. The method of claim 1, wherein the ultrasonic vibration in step b) takes 1-3 hours.

* * * * *